(12) United States Patent
Capoglu et al.

(10) Patent No.: US 11,048,011 B2
(45) Date of Patent: Jun. 29, 2021

(54) SIGNAL ARITHMETIC PROCESSOR AND SENSOR SYSTEM

(71) Applicant: Halliburton Energy Services, Inc., Houston, TX (US)

(72) Inventors: Ilker R. Capoglu, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/774,578

(22) PCT Filed: Dec. 8, 2015

(86) PCT No.: PCT/US2015/064563
§ 371 (c)(1),
(2) Date: May 8, 2018

(87) PCT Pub. No.: WO2017/099733
PCT Pub. Date: Jun. 15, 2017

(65) Prior Publication Data
US 2018/0321411 A1    Nov. 8, 2018

(51) Int. Cl.
*G02B 6/38* (2006.01)
*G01V 3/18* (2006.01)
(Continued)

(52) U.S. Cl.
CPC .............. *G01V 3/18* (2013.01); *E21B 47/135* (2020.05); *G01V 8/00* (2013.01)

(58) Field of Classification Search
CPC .................. G01R 33/0327; G01R 33/022; G01R 15/241; G01R 15/248; G01V 3/18; G01V 3/00; E21B 47/135
See application file for complete search history.

(56) References Cited

U.S. PATENT DOCUMENTS

| 4,939,447 A | 7/1990 | Bohnert et al. |
| 5,123,065 A * | 6/1992 | Enochs ................. G02F 1/0356 385/8 |

(Continued)

FOREIGN PATENT DOCUMENTS

| JP | 2002-116087 A | 4/2002 |
| WO | WO-2015130298 A1 * | 9/2015 ........... E21B 47/123 |
| WO | WO-2015178876 A1 | 11/2015 |

OTHER PUBLICATIONS

International Search Report prepared by Authorized Officer Sung Chul Kang of the Korean Intellectual Property Office as ISA, dated Aug. 30, 2016, issued in corresponding International Patent Application No. PCT/US2015/064563.

(Continued)

*Primary Examiner* — Alesa Allgood
(74) *Attorney, Agent, or Firm* — Locke Lord LLP (57) ABSTRACT

In accordance with at least one aspect of this disclosure, a signal arithmetic processor includes a fiber optic cable including a fiber optic input and a fiber optic output and two or more electro-optical transducers coupled to the fiber optic cable between the fiber optic input and output and having at least a first electrode and second electrode, the two or more electro-optical transducers configured to modify an optical signal in the fiber optic cable based on a voltage between the first electrode and the second electrode of the two or more electro-optical transducers. The signal arithmetic processor can also include an interferometer coupled to the fiber optic cable and configured to sense a phase difference of a fiber optic signal between the fiber optic input and the fiber optic output.

20 Claims, 6 Drawing Sheets

(51) Int. Cl.
*G01V 8/00* (2006.01)
*E21B 47/135* (2012.01)

(56) References Cited

U.S. PATENT DOCUMENTS

| | | |
|---|---|---|
| 5,675,674 A | 10/1997 | Weis |
| 2007/0258319 A1 | 11/2007 | Ronnekleiv et al. |
| 2008/0186506 A1 | 8/2008 | Lopushansky |
| 2014/0097848 A1* | 4/2014 | LeBlanc ................ E21B 47/06 |
| | | 324/338 |
| 2014/0139225 A1 | 5/2014 | Mandviwala |
| 2014/0191120 A1* | 7/2014 | Donderici ............ E21B 47/123 |
| | | 250/265 |
| 2016/0259085 A1* | 9/2016 | Wilson ................. E21B 47/123 |

OTHER PUBLICATIONS

Search Report, of the Netherlands Patent Office—Netherlands Enterprise Agency—, dated Mar. 13, 2017, issued in corresponding NL Patent Application No. 1042120.

* cited by examiner

*Fig. 6*

SIGNAL ARITHMETIC PROCESSOR AND SENSOR SYSTEM

CROSS REFERENCE TO RELATED APPLICATIONS

This application is the national phase under 35 U.S.C. § 371 of PCT International Application No. PCT/US2015/064563, filed Dec. 8, 2015. The entire contents of this patent application are hereby incorporated by reference herein.

BACKGROUND

1. Field

The present disclosure relates to electromagnetic (EM) and fiber optic (FO) sensors for reservoir monitoring.

2. Description of Related Art

Permanently installed fiber optic-based electromagnetic (EM) reservoir monitoring systems can be used to monitor one or more conditions in a reservoir. Such systems can include EM sensors bonded to an optical fiber that are remotely interrogated.

In certain systems, when there are multiple EM sensors operating independently on a sensor system (e.g., in a wireline array tool or a reservoir monitoring array), it may be necessary to perform arithmetic operations and linear combinations on the outputs of these sensors. A possible solution would require using complex active electronics (amplifiers, microprocessors, etc.) which are not capable of withstanding the high temperatures and pressures of the downhole environment.

An alternative method is to measure each EM sensor output individually and combine them at the surface. This has the disadvantage of requiring either miles of extra fiber optic line (for each fiber optic sensor) or the implementation of complicated optical multiplexing schemes.

Such conventional methods and systems have generally been considered less than satisfactory for their intended purpose. Thus, there is still a need in the art for improved sensor systems. The present disclosure provides a solution for this need.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
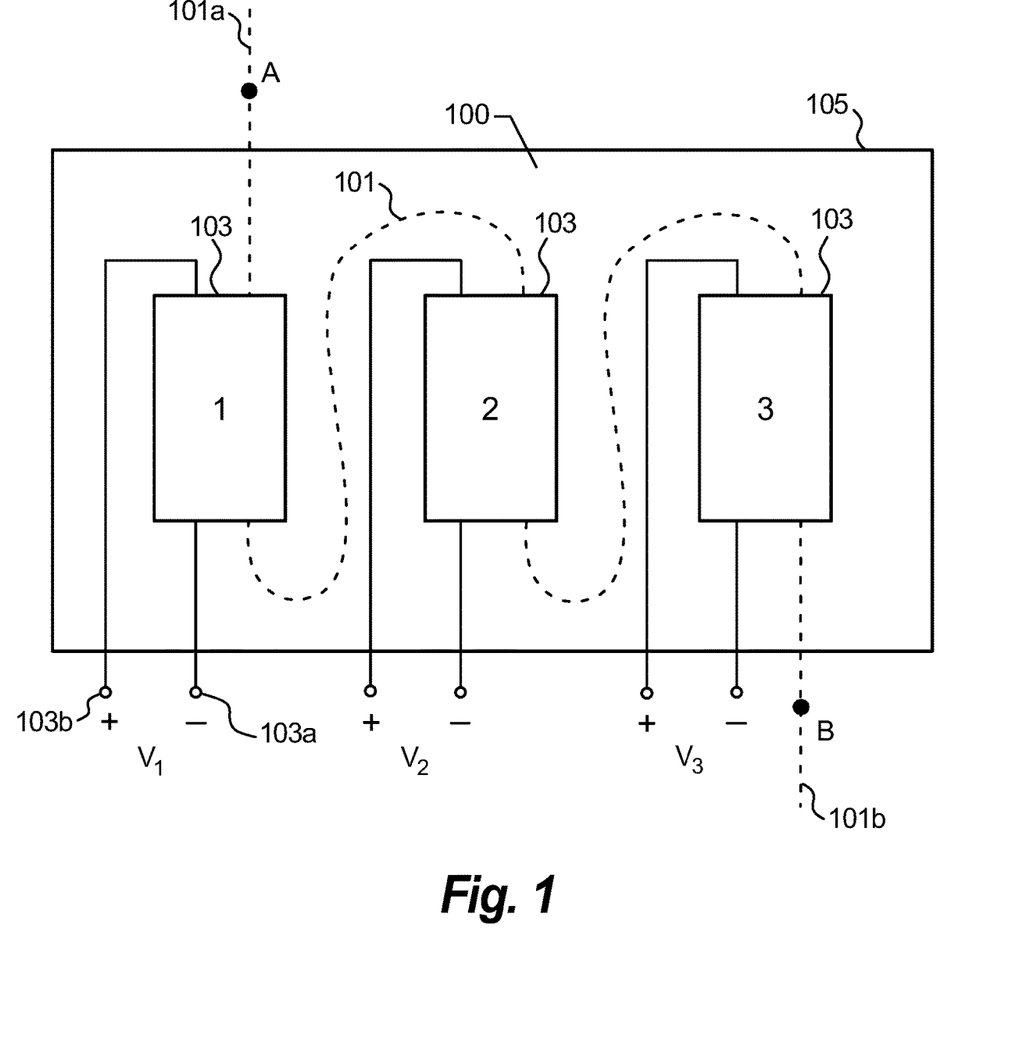
FIG. 1 is a schematic plan view of an embodiment of a signal arithmetic processor in accordance with this disclosure, showing a first, second, and third fiber optic transducers having first, second, and third voltage terminal pairs, and a single fiber passing through all transducers.

Reference will now be made to the drawings wherein like reference numerals identify similar structural features or aspects of the subject disclosure. For purposes of explanation and illustration, and not limitation, an illustrative view of an embodiment of a signal arithmetic processor in accordance with the disclosure is shown in FIG. 1 and is designated generally by reference character 100. Other embodiments and/or aspects of this disclosure are shown in FIGS. 2-6. The systems and methods described herein can be used to process a plurality of sensor signals.

In accordance with at least one aspect of this disclosure, a signal arithmetic processor 100 includes a fiber optic cable 101 including a fiber optic input 101a and a fiber optic output 101b. The fiber optic cable 101 can include one or more fibers and/or segments thereof for carrying a fiber optic signal therein. In certain embodiments, the fiber optic input 101a can be operatively connected to a fiber optic receiver (e.g., associated with a computer) for reading a fiber optic signal. One or both of the fiber optic input 101a and the fiber optic output 101b can be operatively connected to a fiber optic signal interrogator (not expressly shown) for measuring signal differences between the input 101a and the output 101b.

Two or more electro-optical transducers 103 are coupled to the fiber optic cable 101 between the fiber optic input 101a and output 101b. Each transducer 103 has at least a first electrode 103a and second electrode 103b. The two or more electro-optical transducers 103 are configured to modify an optical signal in the fiber optic cable 101 based on a voltage between the first electrode 103a and the second electrode 103b of each respective electro-optical transducers 103.

In certain embodiments, the signal arithmetic processor 100 can include at least two (e.g., three as shown in FIG. 1) electro-optical transducers 103. In certain embodiments, each electro-optical transducer 103 can have a predetermined scale factor for controlling the effect of the voltage acting on each transducer 103 on the optical signal in the fiber optical cable 101.

In certain embodiments, the predetermined scale factor of each electro-optical transducer 103 can be different. For example, each of the predetermined scale factors can be selected based on a characteristic of an associated sensor for each transducer 103. The characteristic of each transducer can include at least one of, for example, a location of the associated sensor, a sensor design, and/or any other suitable sensor characteristics.

As shown in FIG. 1, a number of transducers 103 can be placed in a processor package 105, with a single common fiber optic cable 101 passing through each transducer 103. There may be N number of transducers 103 (e.g., N=3 as shown) in a given processor package 105. Although FIG. 1 shows three transducers 103 (e.g., labelled as 1, 2, and 3), any suitable number of transducers 103 can be utilized. Each electrode pair 103a, 103b is exposed to an input voltage denoted in FIG. 1 by $V_1$, $V_2$, and $V_3$ for each transducer 103, respectively. Each of these voltages can be the output of a suitable sensor (e.g., as described below in FIGS. 4, 5, and 6). In certain embodiments, each transducer 103 can convert the voltage applied to its electrodes 103a, 103b into a change in total phase of the light (e.g., a fiber optic signal) passing through the fiber optic cable 101. In certain cases, a positive/negative voltage corresponds to a positive/negative change in phase.

Figure 4:
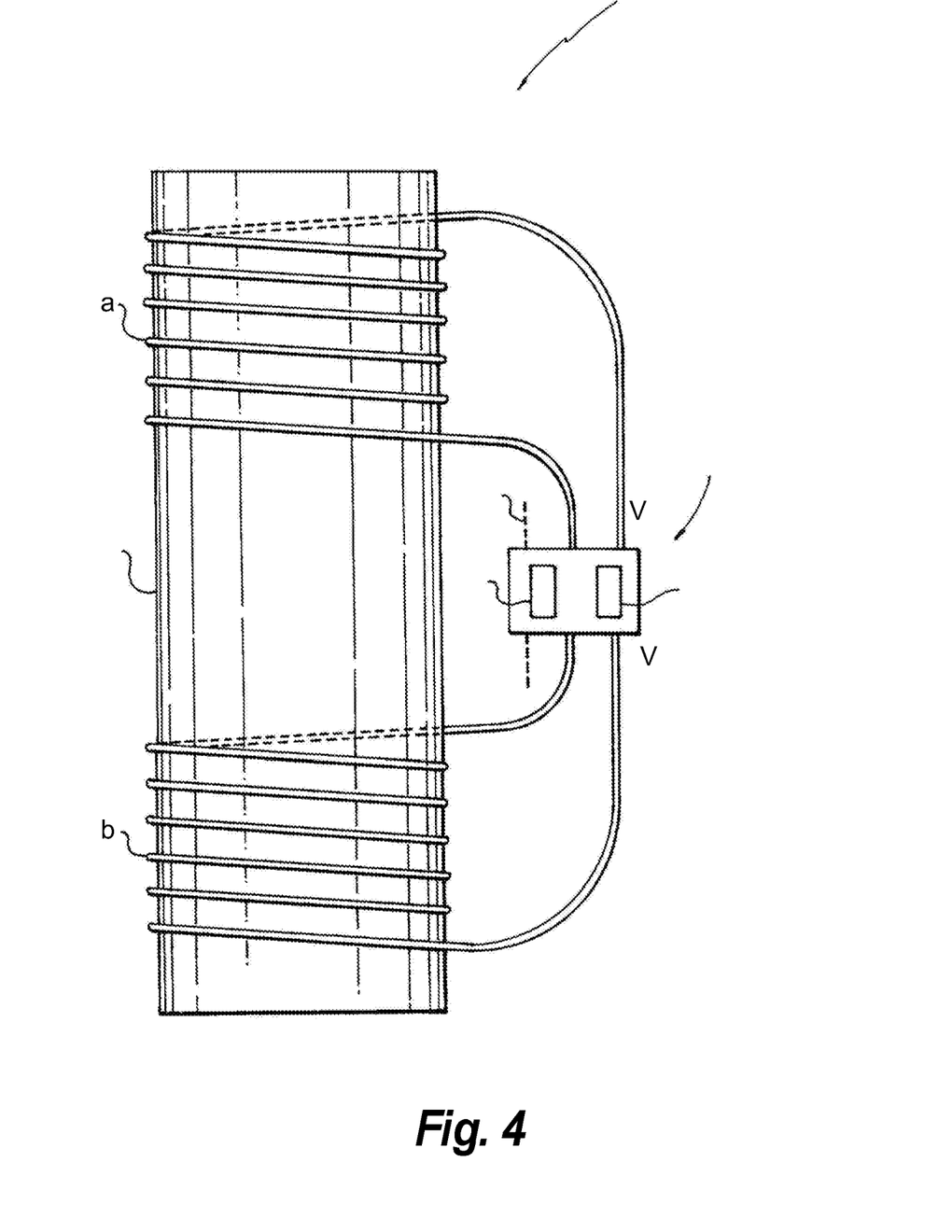
FIG. 4 is a side elevational schematic view of an embodiment of a magnetic-field sensing system, shown with the outputs of two receiver coils connected to first and second voltage terminals of an arithmetic processing unit to subtract one output from the other for axial bucking.
Figures 5, 6:
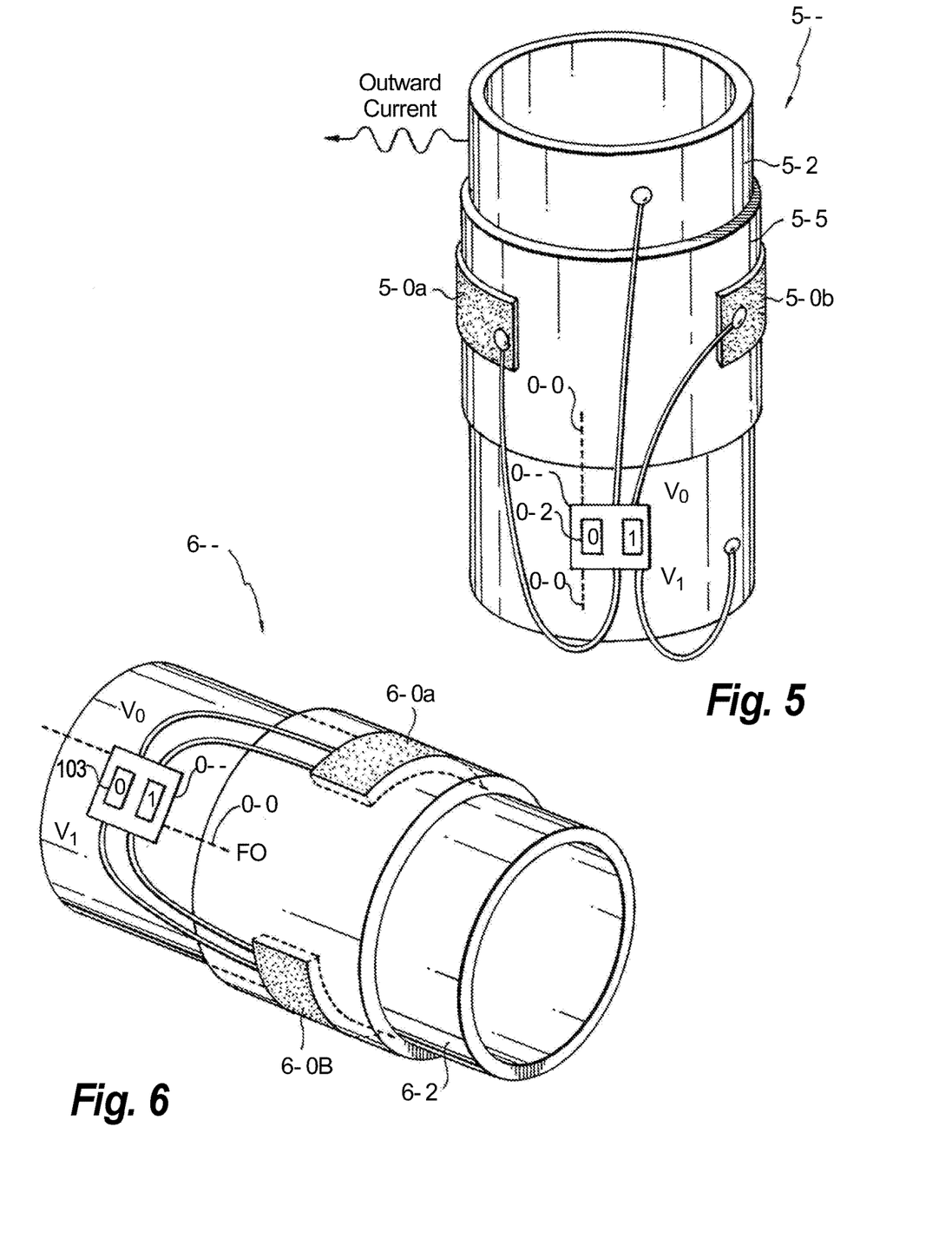
FIG. 5 is a perspective schematic view of an embodiment of an electric-field sensing system, shown with the outputs of two azimuthally-opposite electrodes and a metallic supporting tubular structure connected to a signal arithmetic processor which subtracts one from the other for azimuthal bucking.
FIG. 6 is a perspective schematic view of an embodiment of an electromagnetic (EM) ranging system, shown with two azimuthally-opposed EM sensors placed on a bottom-hole assembly (BHA) operatively connected to a signal arithmetic processor to subtract the outputs of the EM sensors for azimuthal differencing.

The amount of change in the total phase is proportional to the amplitude of the applied voltage. Thus the total change of phase between points A and B on the fiber can be expressed by $$\Delta \varnothing = \alpha_1 V_1 + \alpha_2 V_2 + \alpha_3 V_3,$$

where $\alpha_1$, $\alpha_2$, and $\alpha_3$ are scale factors (as described above) for each of the three transducers 103 of FIG. 1, respectively, and where $V_1$, $V_2$, and $V_3$ are voltages applied to each of the three transducers 103 of FIG. 1, respectively. As described above, the scale factors can be a function of physical characteristics of associated sensors (e.g., as shown in FIGS. 4-6), which can be customized to for any desired arithmetic operation. For example, a negative scale factor can be realized by reversing the polarity of the associated electrodes 103a, 103b such that the input voltage is reversed.

Figure 2:
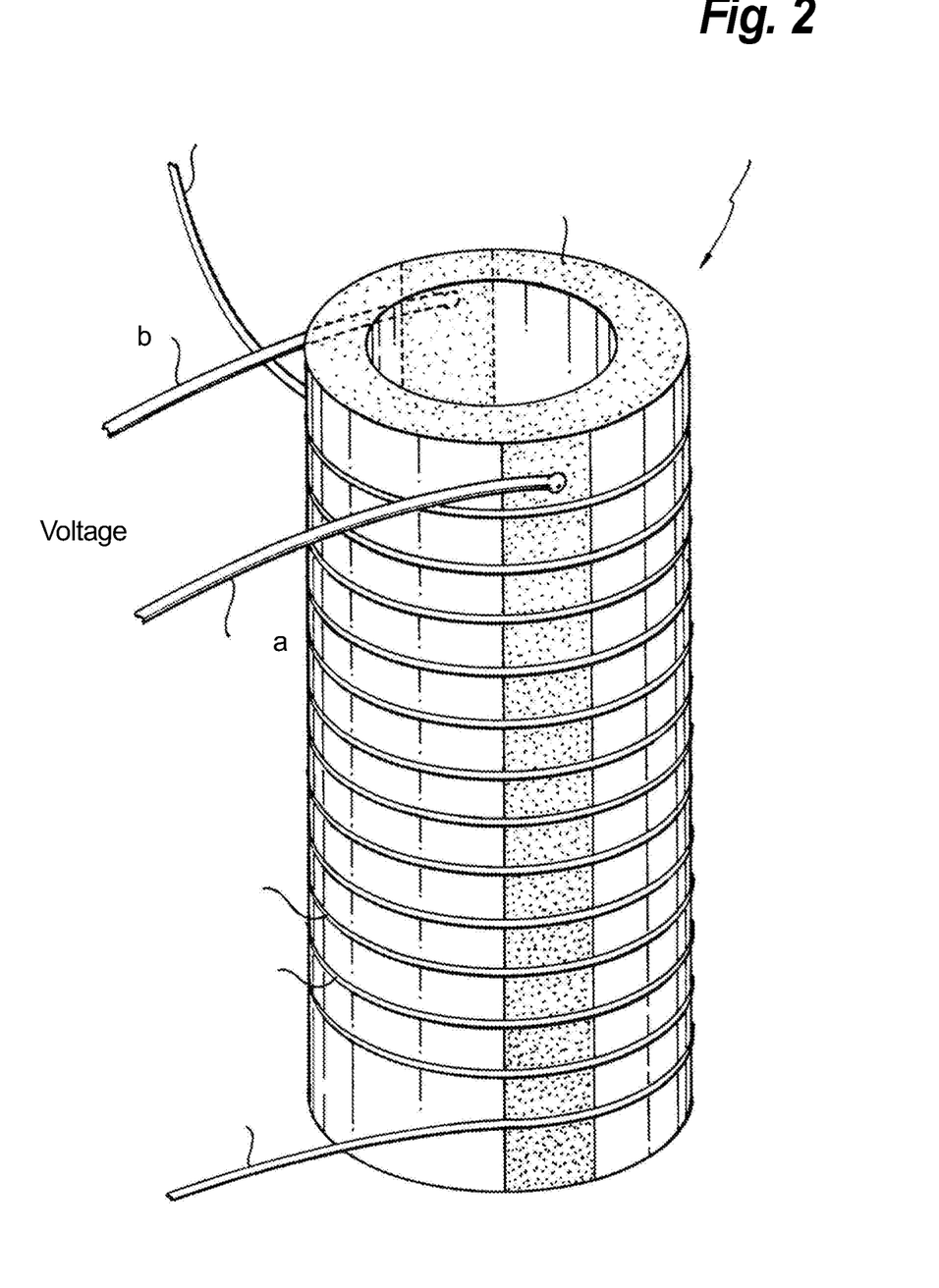
FIG. 2 is a perspective view of an embodiment of an electro-optical transducer in accordance with this disclosure.

Referring to FIG. 2, one or more of the transducers 103 can include a piezoelectric body 201 operatively connected to the first and second electrode 103a, 103b. As shown, the fiber optic cable 101 can be wound around the piezo-electric body 201 such that any strain in the piezoelectric body 201 is effectively transferred to the fiber. The strain induced in the piezoelectric body 201 (and hence the strain transferred to the fiber) is proportional to the voltage applied across its electrodes 103a, 103b. The predetermined scale factors as described above can be a function of at least one of piezoelectric coefficient of the body 201 and/or the number of optic cable 101 windings around the body 201. Thus, for example, in certain embodiments, the scale factor can be doubled if the number of turns of the fiber optic cable 101 are doubled.

While the body 201 is shown as cylindrical, any suitable shape is contemplated herein. While the fiber optic cable 101 is shown wound around a circumference of the body 201, it is contemplated that the cable 101 can be wound in longitudinal and/or any other suitable manner (e.g., with multiple layers of winding). While the electrodes 103a, 103b are often longitudinal plates, the electrodes 103a, 103b can have any suitable shape and can be placed at any suitable position on the body 201 (e.g., for exciting a certain piezoelectric resonance mode).

In certain embodiments, one or more of the transducers 103 can include a lithium niobate (LiNbO3) phase modulator. The voltage applied across the LiNbO3 phase modulator causes a variation of the refractive index inside the LiNbO3 phase modulator. This causes a modulation of optical phase change in the light travelling through the LiNbO3 phase modulator.

Figure 3A:
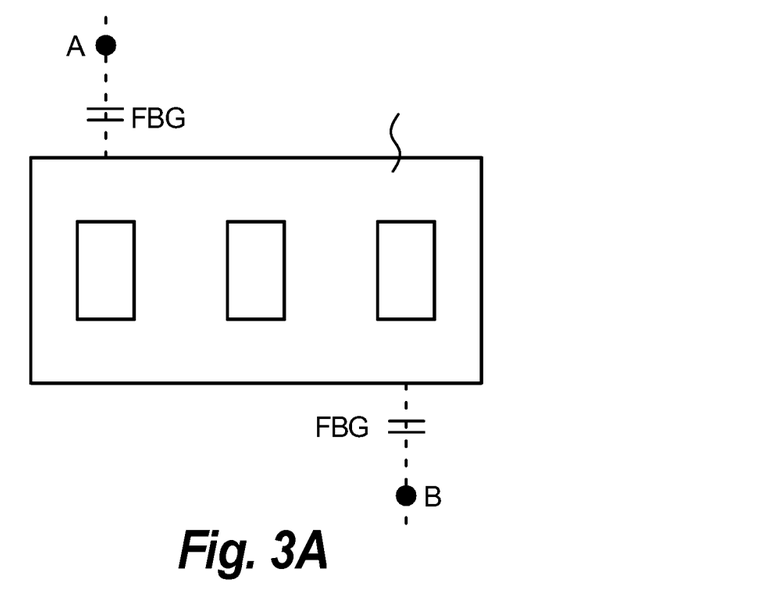
FIG. 3A shows an embodiment of a setup for interrogating total phase change in the signal arithmetic processor of FIG. 1 using an intrinsic Fabry-Perot interferometer (IFPI)
Figure 3B:
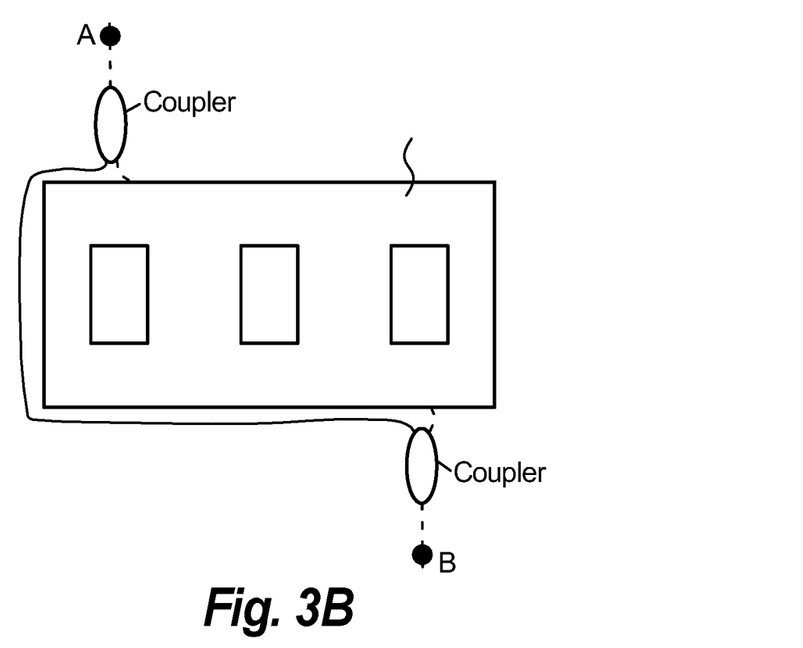
FIG. 3B shows an embodiment of a setup for interrogating the total phase change in the signal arithmetic processor of FIG. 1 using Mach-Zehnder interferometer.
Figure 3C:
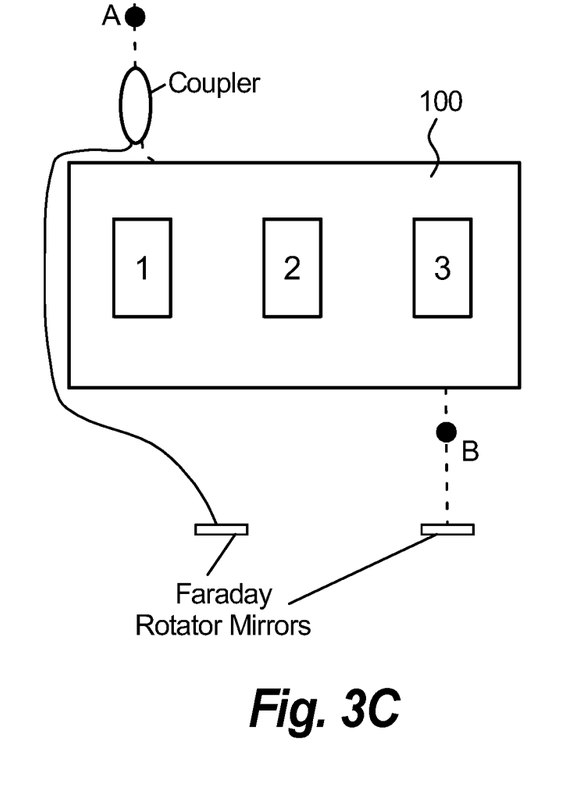
FIG. 3C shows an embodiment of a setup for interrogating the total phase change in the signal arithmetic processor of FIG. 1 using a Michelson interferometer.

Referring to FIGS. 3A-3C, the optical phase change of the fiber optic signal between the input 101a and the output 101b can be remotely interrogated using well known interrogation techniques such as intrinsic Fabry-Perot with the interrogator located at the surface as shown in FIG. 3A. In this case, two partially reflective mirrors (e.g., Fiber Bragg gratings ("FBG")) are located at the input 101a and the output 101b. Similarly, other interrogating methods involving a Mach-Zehnder (see couplers) and/or Michelson (see Faraday rotator mirrors) interferometer can be applied as shown in FIGS. 3B and 3C, respectively.

In accordance with at least one aspect of this disclosure, a sensor system can include a plurality of sensors and a signal arithmetic processor as described above, wherein each electro-optical transducer 103 is configured to modify an optical signal in the fiber optic cable 101 based on a voltage from each sensor between the first electrode 103a and the second electrode 103b of each electro-optical transducer 103. The plurality of sensors can include a magnetic field sensor. In certain embodiments, the plurality of sensors include an electric field sensor. Any suitable sensor is contemplated herein.

Referring to FIG. 4, a portion of a magnetic-field sensing system 400 is illustrated. The system 400 has sensors that include two axial receiver coils 401a, 401b wrapped around a supporting structure 403 (e.g., a mandrel of a wireline tool, a bottom hole-assembly (BHA) of an LWD/MWD tool, or a casing of a reservoir monitoring system). The outputs of the receiver coils 401a, 401b are connected to electrodes 103a, 103b of a respective transducer 103 of a signal arithmetic processor 100.

The system 400 is amenable to conventional axial receiver-side bucking, which is a way of canceling the direct signal from the transmitter (not shown in FIG. 4). However, by using the signal arithmetic processor 100 as described hereinabove, the voltage outputs of coil 401a can be subtracted from that of coil 401b inside the signal arithmetic processor 100 downhole without the need for complex electronics. Moreover, the winding orientations (clockwise vs. counter-clockwise) of the two receiver coils 401a, 401b are immaterial as long as the voltage inputs to the processor 100 are of the correct polarity.

Referring to FIG. 5, a portion of an embodiment of an electric-field sensing system 500 is illustrated. Excitation current is shown flowing nearly azimuthally outward from a cylindrical metallic supporting structure 503 (e.g., a mandrel of a wireline tool, a bottom hole-assembly (BHA) of an LWD/MWD tool, or a casing of a reservoir monitoring system). The outward current can be collected far away at another metallic object (e.g., a ground stake). One or more receiver electrode pairs 501a, 501b can be placed around the structure 503 in any suitable azimuthal pattern on an insulating pad 505.

In this embodiment, voltages $V_1$ and $V_2$ from each electrode 501a, 501b on the supporting structure 503 are input to the signal arithmetic processor 100 which subtracts $V_1$ from $V_2$, possibly with some scaling factors as described above. This embodiment corresponds to an azimuthal bucking scheme, which serves to cancel the baseline voltage without any formation inhomogeneities, but without the need for complex electronics. Any suitable number of receiver electrode pairs 501a, 501b could be placed around the supporting structure 503, and each pair 501a, 501b can be bucked using one or more signal arithmetic processors 100 (e.g., each pair 501a, 501b can have separate processors 100). More electrode pairs around the supporting structure 503 can provide more azimuthal sensitivity to formation inhomogeneity, for example.

Referring to FIG. 6, an embodiment of an EM ranging system 600 is shown having a pair of EM sensors 601a, 601b (e.g., magnetometers or magnetometer arrays) placed in different azimuthal locations on a section 603 of a bottom-hole-assembly (BHA). The output voltages of the two EM sensors 601a, 601b can be connected as inputs to a signal arithmetic processor 100, which then takes the difference between the two voltages, possibly with some scaling factors as described above. This type of processing can be useful for determining the azimuthal direction to a current source. Any suitable number of sensor pairs 601a, 601b can be placed around the BHA section 603, and each pair can be differenced using one or more processors 100 (e.g., one for each pair). More sensor pairs around the BHA section 603 can provide better azimuthal ranging sensitivity, for example.

It is contemplated that any other suitable well tool (e.g., with a tubular body) can include a plurality of sensors disposed on or within the tubular body and a signal arithmetic processor as described above disposed on or within the tubular body. As an example, embodiments can be used to process data from array tools on wireline logging devices, from array tools on logging-while-drilling (LWD) or measuring while-drilling (MWD) equipment, from array tools on permanent reservoir monitoring systems, from array tools on EM ranging systems, and from array tools on cement monitoring systems. Also, embodiments can be deployed on either metal (e.g., steel) casing or insulated (e.g., fiber glass) casing, deployed in either offshore or onshore wells, and/or operated in the presence of any formation fluid.

Utilizing devices and systems as described above, when there are multiple EM sensors operating independently on a sensor system (such as in a wireline array tool or a reservoir monitoring array), it is possible to perform arithmetic operations and linear combinations of signals on the outputs of the sensors without using any complex active electronics (amplifiers, microprocessors, etc.). As a result, the reliability of the whole system is improved substantially. For example, embodiments remove the need for extra wires, fiber lines, and complicated multiplexing schemes for performing the same linear combination of EM sensor outputs.

Aspects

In accordance with at least one aspect of this disclosure, a signal arithmetic processor includes a fiber optic cable including a fiber optic input and a fiber optic output and two or more electro-optical transducers coupled to the fiber optic cable between the fiber optic input and output and having at least a first electrode and second electrode the two or more electro-optical transducers configured to modify an optical signal in the fiber optic cable based on a voltage between the first electrode and the second electrode of the two or more electro-optical transducers. The signal arithmetic processor can also include an interferometer coupled to the fiber optic cable and configured to sense a phase difference of a fiber optic signal between the fiber optic input and the fiber optic output.

In certain embodiments, each electro-optical transducer can include a predetermined scale factor. The predetermined scale factor of each electro-optical transducer can be different from at least one other electro-optical transducer or the same. Each of the predetermined scale factors can be selected based on a characteristic of an associated sensor for each transducer. The characteristic of each electro-optical transducer can include at least one of a location of the associated sensor or a sensor design.

The two or more electro-optical transducers can include a piezoelectric body operatively connected to the first and second electrode, wherein the fiber optic cable is wound around the piezo-electric body. The predetermined scale factors can be a function of at least one of piezoelectric coefficient or the number of cable windings.

In certain embodiments, the interferometer can include at least one of an intrinsic Fabry-Perot interferometer, a Mach-Zehnder interferometer, or a Michelson interferometer.

A sensor system can include a plurality of sensors and a signal arithmetic processor having a fiber optic cable including a fiber optic input and a fiber optic output and a plurality of electro-optical transducers coupled to the fiber optic cable between the fiber optic input and output and having at least a first electrode and second electrode electrically connected to each sensor, wherein each electro-optical transducer is configured to modify an optical signal in the fiber optic cable based on a voltage from each sensor between the first electrode and the second electrode of each electro-optical transducer. The signal arithmetic processor can also include an interferometer coupled to the fiber optic cable and configured to sense a phase difference of a fiber optic signal between the fiber optic input and the fiber optic output.

In certain embodiments, the plurality of electro-optical transducers can include two electro-optical transducers. Each electro-optical transducer can include a predetermined scale factor. The predetermined scale factor of each electro-optical transducer can be different from at least one other electro-optical transducer.

In certain embodiments, the predetermined scale factors can be selected based on a characteristic of an associated sensor for each electro-optical transducer. The characteristic of each electro-optical transducer can include at least one of a location of the associated sensor or a sensor design.

The two or more electro-optical transducers can include a piezoelectric body operatively connected to the first and second electrode, wherein the fiber optic cable is wound around the piezo-electric body. In certain embodiments, the predetermined scale factors can be a function of at least one of piezoelectric coefficient or the number of cable windings.

The plurality of sensors can include a magnetic field sensor. In certain embodiments, the plurality of sensors include and electric field sensor.

In certain embodiments, the interferometer can include at least one of an intrinsic Fabry-Perot interferometer, a Mach-Zehnder interferometer, or a Michelson interferometer.

A well tool can include a tubular body, a plurality of sensors disposed on or within the tubular body, and a signal arithmetic processor disposed on or within the tubular body, the signal arithmetic processor including features as described above.

The methods and systems of the present disclosure, as described above and shown in the drawings, provide for sensor systems with superior properties including downhole signal arithmetic processing. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A signal arithmetic processor, comprising:
   a fiber optic cable including a fiber optic input and a fiber optic output; and two or more electro-optical transducers coupled to the fiber optic cable between the fiber optic input and the fiber optic output, each electro-optical transducer having at least a first electrode and a second electrode and configured to modify an optical signal in the fiber optic cable based on a voltage between the first electrode and the second electrode, wherein at least one of the two or more electro-optical transducers comprises a lithium niobate phase modulator; and an interferometer coupled to the fiber optic cable and configured to sense a phase difference of a fiber optic signal between the fiber optic input and the fiber optic output.

2. The signal arithmetic processor of claim 1, wherein the interferometer includes at least one of an intrinsic Fabry-Perot interferometer, a Mach-Zehnder interferometer, or a Michelson interferometer.

3. The signal arithmetic processor of claim 1, wherein each electro-optical transducer includes a predetermined scale factor.

4. The signal arithmetic processor of claim 3, wherein the predetermined scale factor of each electro-optical transducer is different from at least one other electro-optical transducer.

5. The signal arithmetic processor of claim 3, wherein each of the predetermined scale factors is selected based on a characteristic of an associated sensor for each electro-optical transducer.

6. The signal arithmetic processor of claim 5, wherein the characteristic of an associated sensor for each transducer includes at least one of a location of the associated sensor or a sensor design.

7. The signal arithmetic processor of claim 1, wherein the two or more electro-optical transducers include a piezoelectric body operatively connected to the first and second electrode and wherein the fiber optic cable is wound around the piezo-electric body.

8. The signal arithmetic processor of claim 3, wherein the predetermined scale factors are a function of at least one of piezoelectric coefficient or the number of cable windings.

9. A sensor system, comprising:
a plurality of sensors; and
a signal arithmetic processor, comprising:
a fiber optic cable including a fiber optic input and a fiber optic output; and
a plurality of electro-optical transducers coupled to the fiber optic cable between the fiber optic input and the fiber optic output, each electro-optical transducer having at least a first electrode and a second electrode electrically connected to each sensor, wherein each electro-optical transducer is configured to modify an optical signal in the fiber optic cable based on a voltage from each sensor between the first electrode and the second electrode of each electro-optical transducer, wherein at least one of the plurality of electro-optical transducers comprises a lithium niobate phase modulator; and
an interferometer coupled to the fiber optic cable and configured to sense a phase difference of a fiber optic signal between the fiber optic input and the fiber optic output.

10. The system of claim 9, wherein the two or more electro-optical transducers include a piezoelectric body operatively connected to the first and second electrode and wherein the fiber optic cable is wound around the piezoelectric body.

11. The system of claim 9, wherein the plurality of sensors include a magnetic field sensor.

12. The system of claim 9, wherein the plurality of sensors include an electric field sensor.

13. The system of claim 9, wherein the interferometer includes at least one of an intrinsic Fabry-Perot interferometer, a Mach-Zehnder interferometer, or a Michelson interferometer.

14. The sensor system of claim 9, wherein at least one of the plurality of sensors includes axial receiver coils, and wherein outputs of the axial receiver coils are connected to the first electrode and the second electrode of one of the electro-optical transducers.

15. The system of claim 9, wherein each electro-optical transducer includes a predetermined scale factor.

16. The system of claim 15, wherein the predetermined scale factors are a function of at least one of piezoelectric coefficient or the number of cable windings.

17. The system of claim 15, wherein the predetermined scale factor of each electro-optical transducer is different from at least one other electro-optical transducer.

18. The system of claim 15, wherein each of the predetermined scale factors is selected based on a characteristic of an associated sensor for each electro-optical transducer.

19. The system of claim 18, wherein the characteristic of an associated sensor for each transducer includes at least one of a location of the associated sensor or a sensor design.

20. A well tool, comprising:
a tubular body;
a plurality of sensors disposed on or within the tubular body; and
a signal arithmetic processor disposed on or within the tubular body, the signal arithmetic processor comprising:
a fiber optic cable including a fiber optic input and a fiber optic output; and
a plurality of electro-optical transducers coupled to the fiber optic cable between the fiber optic input and output, each electro-optical transducer having at least a first electrode and a second electrode electrically connected to each sensor, wherein each electro-optical transducer is configured to modify an optical signal in the fiber optic cable based on a voltage from each sensor between the first electrode and the second electrode of each electro-optical transducer, wherein at least one of the plurality of electro-optical transducers comprises a lithium niobate phase modulator; and
an interferometer coupled to the fiber optic cable and configured to sense a phase difference of a fiber optic signal between the fiber optic input and the fiber optic output.

* * * * *